United States Patent
Raabjerg Jensen et al.

(10) Patent No.: US 12,385,496 B2
(45) Date of Patent: Aug. 12, 2025

(54) CENTRIFUGAL PUMP HOUSING

(71) Applicant: ALFA LAVAL CORPORATE AB, Lund (SE)

(72) Inventors: Jesper Raabjerg Jensen, Middelfart (DK); Poul Anton Daugaard, Kolding (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 18/724,403

(22) PCT Filed: Jan. 13, 2023

(86) PCT No.: PCT/EP2023/050732
§ 371 (c)(1),
(2) Date: Jun. 26, 2024

(87) PCT Pub. No.: WO2023/135249
PCT Pub. Date: Jul. 20, 2023

(65) Prior Publication Data
US 2025/0059978 A1 Feb. 20, 2025

(30) Foreign Application Priority Data
Jan. 14, 2022 (EP) .................................. 22151564

(51) Int. Cl.
*F04D 29/12* (2006.01)
*F16J 15/34* (2006.01)

(52) U.S. Cl.
CPC .............. *F04D 29/12* (2013.01); *F16J 15/34* (2013.01)

(58) Field of Classification Search
CPC ...... F04D 29/10; F04D 29/102; F04D 29/106; F04D 29/12
See application file for complete search history.

(56) References Cited

U.S. PATENT DOCUMENTS

| 5,096,396 A | 3/1992 | Welch |
| 5,195,867 A | 3/1993 | Stirling |

(Continued)

FOREIGN PATENT DOCUMENTS

| CN | 204677443 U | 9/2015 |
| CN | 110836188 A | 2/2020 |

(Continued)

OTHER PUBLICATIONS

International Search Report (PCT/ISA/210) and Written Opinion (PCT/ISA/237) mailed on Apr. 24, 2023, by the European Patent Office as the International Searching Authority for International Application No. PCT/EP2023/050732. (13 pages).

*Primary Examiner* — Brian O Peters
(74) *Attorney, Agent, or Firm* — BUCHANAN INGERSOLL & ROONEY PC

(57) ABSTRACT

A centrifugal pump housing comprises a rear housing part having a drive shaft opening, a front housing part attachable to the rear housing part for forming a pump chamber, and a sealing arrangement for sealing the drive shaft opening. The sealing arrangement comprises a stationary annular seal element that is rotationally locked and that has a stationary plane seal surface facing forwards in the axial direction, and a rotatable annular seal element configured to be rotationally locked. The rotatable annular seal element has a rotatable plane seal surface facing rearwards in the axial direction and configured to sealingly abut against the stationary plane seal surface. Stationary protrusions are integrally formed in the rear housing part or in the sealing retainer, and are located in or adjacent the drive shaft opening for increasing the turbulence of a flow of product fluid in the pump housing adjacent to the sealing arrangement.

19 Claims, 10 Drawing Sheets

(56) References Cited

U.S. PATENT DOCUMENTS

| | | | |
|---|---|---|---|
| 5,489,187 A | 2/1996 | Ray | |
| 6,966,749 B2 | 11/2005 | Loyd et al. | |
| 2013/0255804 A1* | 10/2013 | Smith | F04D 29/126 |
| | | | 137/561 R |
| 2019/0264690 A1 | 8/2019 | Burke et al. | |

FOREIGN PATENT DOCUMENTS

| | | |
|---|---|---|
| CN | 111794977 B | 6/2021 |
| DE | 3343685 A1 | 6/1985 |
| JP | 3760126 B2 | 3/2006 |
| WO | 2019199222 A1 | 10/2019 |

\* cited by examiner

CENTRIFUGAL PUMP HOUSING

TECHNICAL FIELD

The present disclosure relates to centrifugal pump housing, as well as a method for cleaning a sealing arrangement of a centrifugal pump in place.

The pump according to the disclosure can be arranged for pumping a variety of different product fluids, in particular product fluids commonly known in dairy, food, beverage, pharmaceutical, biotech and personal care markets.

BACKGROUND

In the field of centrifugal pumps, there is a continuous demand for further improved performance in terms of cleanability, contamination safety and low maintenance.

For example, cleanability in the region behind the impeller and in the region of the shaft seal is generally complicated due to the relatively restricted access to cleaning fluid.

There is thus a need for a further improved centrifugal pump in terms of cleanability, contamination safety and low maintenance.

SUMMARY

An object of the present disclosure is to provide a centrifugal pump housing, and method for cleaning a sealing arrangement of a centrifugal pump in place, that contributes to further enhanced performance in terms of cleanability, contamination safety and low maintenance. This object is at least partly achieved by the features of the independent claims.

According to a first aspect of the present disclosure, there is provided a centrifugal pump housing configured to accommodate an impeller mounted on an axially extending drive shaft operably connected to a motor for rotation of the impeller. The pump housing comprises a rear housing part having a drive shaft opening, a front housing part attachable to the rear housing part for forming a pump chamber, and a sealing arrangement for sealing the drive shaft opening. The sealing arrangement comprises a stationary annular seal element rotationally locked to the rear housing part or to a sealing retainer mounted in the rear housing part, wherein the stationary annular seal element has a stationary plane seal surface facing forwards in the axial direction, and a rotatable annular seal element configured to be rotationally locked to the impeller or to the drive shaft, wherein the rotatable annular seal element has a rotatable plane seal surface facing rearwards in the axial direction and configured to sealingly abut against the stationary plane seal surface. The pump housing further comprises a plurality of stationary protrusions integrally formed in the rear housing part or in the sealing retainer, wherein the plurality of stationary protrusions are located in or adjacent the drive shaft opening of the rear housing part for increasing the turbulence of a flow of product fluid in the pump housing adjacent to the sealing arrangement.

According to a second aspect of the present disclosure, there is provided a method for cleaning a sealing arrangement of a centrifugal pump in place, the method comprising: supplying a cleaning fluid to a fluid inlet opening of a pump housing of the centrifugal pump, wherein the centrifugal pump comprises an axially extending drive shaft operably connected to a motor and an impeller accommodated in the pump housing and rotationally secured to the axially extending drive shaft, and wherein the pump housing comprises a rear housing part, a front housing part, and a sealing arrangement for sealing a drive shaft opening in the rear housing part; and operating the motor for driving the impeller of the centrifugal pump, wherein cleaning fluid located between the rear housing part and the impeller is configured to interact with a plurality of stationary protrusions integrally formed in the rear housing part or in a sealing retainer mounted in the rear housing part, wherein the plurality of stationary protrusions are located in or adjacent the drive shaft opening of the rear housing part for increasing the turbulence of a flow of product fluid in the pump housing adjacent to sealing arrangement.

The stationary protrusions integrally formed in the rear housing part or in a sealing retainer provides increased fluid turbulence in the area of the sealing arrangement, because the circulating fluid collides with the protrusions and is prevented from having a more laminar flow. The increased fluid turbulence in the region of the sealing arrangement caused by the stationary protrusions results in improved cleanability and contamination safety, because a turbulent flow results in a more distributed flow and reduced risk for low flow areas in the regions of the sealing arrangement, and because a turbulent flow has an improved cleaning effect due to increased fluid force acting the walls of the pump chamber.

Furthermore, the product wetted area is on the outer diameter of the sealing arrangement making it an internal shaft seal. This generally enables an improved cleanability and contamination-free design because both working product and cleaning agent more easily accesses the area of the sealing arrangement, thereby improving cleanability of the sealing arrangement and O-rings and reducing the risk for contamination or low flow areas.

Further advantages are achieved by implementing one or several of the features of the dependent claims.

In some example embodiments, the rear housing part and/or the sealing retainer has an annular recess, specifically a conical annular recess, located at or adjacent to the drive shaft opening of the rear housing part, and the plurality of stationary protrusions are located in said annular recess. Thereby, working fluid and/or cleaning agent more easily reaches the sealing arrangement and with increased level of turbulence.

In some example embodiments, that may be combined with any one or more of the above-described embodiments, the drive shaft opening of the rear housing part includes a cylindrical portion and an annular recess portion facing forwards towards the impeller, wherein the stationary annular seal element is directly or indirectly attached to the cylindrical portion, and the plurality of stationary protrusions are located in said annular recess portion. Thereby, working fluid and/or cleaning agent more easily reaches the sealing arrangement and with increased level of turbulence.

In some example embodiments, that may be combined with any one or more of the above-described embodiments, the annular sealing retainer is mounted in the rear housing part, the stationary annular seal element is rotationally locked to the sealing retainer, the sealing retainer includes an annular conical recess portion facing forwards towards the impeller, and the plurality of stationary protrusions are located on an interior surface of said conical portion. Thereby, working fluid and/or cleaning agent more easily reaches the sealing arrangement and with increased level of turbulence.

In some example embodiments, that may be combined with any one or more of the above-described embodiments, the stationary protrusions protrude about 0.5-5 mm. This level of protrusion is deemed providing a satisfactory level of increased turbulence and/or guidance of the working fluid and/or cleaning agent.

In some example embodiments, that may be combined with any one or more of the above-described embodiments, at least some of the plurality of stationary protrusions have an elongated form. This may be for guiding a circulating working fluid towards the sealing arrangement. The elongated form of the protrusions provides a satisfactory level of increased turbulence and enables also improved guidance of the working fluid and/or cleaning agent.

In some example embodiments, that may be combined with any one or more of the above-described embodiments, at least some of the plurality of stationary protrusions extend in a radial and/or axial direction of the housing, or inclined with respect to the radial and/or axial direction. This may be for guiding a circulating working fluid towards the sealing arrangement. The extension of the stationary protrusions in a radial and/or axial direction of the housing, or inclined with respect to the radial and/or axial direction provides a satisfactory level of increased turbulence and enables also improved guidance of the working fluid and/or cleaning agent.

In some example embodiments, that may be combined with any one or more of the above-described embodiments, at least some of the elongated stationary protrusions have a certain width parallel or inclined to a circumferential direction of the housing, a certain length in a direction perpendicular to the width direction, and a certain height perpendicular to both the width and length directions. Preferably a maximal length of the elongated protrusion is at least two times larger, specifically at least six times larger, than a maximal width of the elongated protrusion. The elongated form of the protrusions provides a satisfactory level of increased turbulence and enables also improved guidance of the working fluid and/or cleaning agent.

In some example embodiments, that may be combined with any one or more of the above-described embodiments, the plurality of stationary protrusions include a plurality of elongated steps distributed around a circumference of an interior surface of the rear housing part or the sealing retainer. This may be for guiding a circulating working fluid towards the sealing arrangement. The plurality of elongated steps may be distributed around a circumference of an interior surface of an annular recess of the rear housing part or the sealing retainer. In some example embodiments, that may be combined with any one or more of the above-described embodiments, at least one of the steps are facing away from an intended direction of rotation of the impeller. This may be for guiding a circulating working fluid towards the sealing arrangement. Steps provide improved turbulence and/or guidance of the working fluid or cleaning agent.

In some example embodiments, that may be combined with any one or more of the above-described embodiments, the plurality of elongated steps extend perpendicular to an intended direction of rotation of the impeller or inclined with respect to an intended direction of rotation of the impeller. This may be for guiding a circulating working fluid towards the sealing arrangement. The extension of the elongated steps perpendicular to an intended direction of rotation of the impeller or inclined with respect to an intended direction of rotation of the impeller provides a satisfactory level of increased turbulence and enables also improved guidance of the working fluid and/or cleaning agent.

In some example embodiments, that may be combined with any one or more of the above-described embodiments, some, specifically each, of the steps, has a width with a major component in a circumferential direction of the housing, and a length with a major component in a direction perpendicular to said circumferential direction, and a maximal length of the step is at least three times larger, specifically at least six times larger, than a maximal width of the step. The type of elongated form of the steps provides improved guidance of the working fluid and cleaning agent, and sometimes also improved turbulence, depending on the circumstances.

In some example embodiments, that may be combined with any one or more of the above-described embodiments, the plurality of stationary protrusions are formed by a stepwise increase in height defining a step followed by a gradual decrease in height between two consecutive steps. A stepwise height increase followed by a gradual height decrease improves the cleaning. The gradual height decrease eliminates pockets where product potentially may be preserved and may accumulate. The design with a stepwise height increase followed by a gradual height decrease avoids a shadow zone or possible stagnant zone at the back of the protrusion, i.e. at the side of the protrusion facing in the intended direction of rotation of the impeller. Each of the plurality of stationary protrusions may be formed by a stepwise increase in height defining a step followed by a gradual decrease in height between two consecutive steps.

In other words, the interior surface between two consecutive steps may have a gradual decrease in height and then a stepwise increase in height, thereby defining a step. More precisely, the interior surface between two consecutive steps may have a gradual decrease in height over a certain distance and then a stepwise increase in height, thereby defining a step. Even more precisely, in the intended direction of rotation of impeller, the interior surface between two consecutive steps may have a gradual decrease in height over a certain distance and then a stepwise increase in height, thereby defining a step.

Consecutive steps, or two consecutive steps, may also be denoted neighbouring steps. The height may be a height in a radial direction of the housing. The height may be a height with a component in a radial direction of the housing. The height may be a height of an interior surface of the rear housing part or the sealing retainer. The stepwise increase in height may be the same as the gradual decrease in height, or more precisely the height of the stepwise increase in height may be the same as the height of the gradual decrease in height. The gradual decrease in height may be continuous. The gradual decrease in height may be over a certain distance. Such a certain distance may be the distance between two consecutive steps. The certain distance may be along a circumferential direction of the housing and/or along a circumference of an interior surface of the rear housing part or the sealing retainer.

In some example embodiments, that may be combined with any one or more of the above-described embodiments, some, specifically each, of the steps has a width with a major component in a circumferential direction of the housing, and a length with a major component in a direction perpendicular to said circumferential direction, preferably a maximal length of said steps is at least two times larger, specifically at least four times larger, than a maximal width of said steps. This type of step geometry has shown to provide reliable and satisfactory improvement in terms of cleaning performance for various types of working fluids and cleaning agents.

In some example embodiments, that may be combined with any one or more of the above-described embodiments, some, specifically each, of the steps has a width with a major component in a circumferential direction of the housing, and the width of the step is less than a maximal circumferential length between two consecutive steps, specifically at least less than half of the maximal circumferential length between two consecutive steps, more specifically at least less than 25% of the maximal circumferential length between two consecutive steps, and even more specifically at least less than 10% of the maximal circumferential length between two consecutive steps. Such relatively narrow steps provide excellent increase in the level of turbulence of the working fluid or cleaning agent in the area of the sealing arrangement.

The width of the step may be the width of the stepwise increase in height, e.g. the extension or dimension of the stepwise increase in height in the direction of the width. In some example embodiments, that may be combined with any one or more of the above-described embodiments, the plurality of stationary protrusions include a plurality of elongated vanes distributed around a circumference of an interior surface of an annular recess of the rear housing part or the sealing retainer. Protrusions in form of elongated vanes have shown providing reliable and satisfactory improvement in terms of cleaning performance for various types of working fluids and cleaning agents.

In some example embodiments, that may be combined with any one or more of the above-described embodiments, some, specifically each, of the vanes has a width with a major component in a circumferential direction of the housing, and a length with a major component in a direction perpendicular to said circumferential direction, and wherein a maximal length of said vanes is at least two times larger, specifically at least four times larger, than a maximal width of said vanes. This type of vane geometry has shown providing reliable and satisfactory improvement in terms of cleaning performance for various types of working fluids and cleaning agents.

In some example embodiments, that may be combined with any one or more of the above-described embodiments, the width of the vane is constant over a main portion of the length of the vane, or at least not differing more than 30% over a main portion of the length of the vane. Vanes having more or less common width over the length of the vane has shown providing reliable and satisfactory improvement in terms of cleaning performance for various types of working fluids and cleaning agents.

In some example embodiments, that may be combined with any one or more of the above-described embodiments, there are about 2-20 steps or vanes, specifically about 2-10 steps or vanes, and more specifically about 3-6 steps or vanes. This number of vanes has shown providing reliable and satisfactory improvement in terms of cleaning performance for various types of working fluids and cleaning agents.

In some example embodiments, that may be combined with any one or more of the above-described embodiments, the sealing arrangement is arranged such that product fluid comes in contact with primarily a radially exterior side of the stationary and rotatable seal elements. Thereby, improved access and thus improved cleaning of the sealing arrangement is enabled.

In some example embodiments, that may be combined with any one or more of the above-described embodiments, the sealing arrangement comprises at least one mechanical spring arranged to urge the stationary annular seal element in the axial direction towards the rotatable annular seal element, or arranged to urge the rotatable annular seal element in the axial direction towards the stationary annular seal element. Furthermore, the sealing arrangement further comprises a stationary annular elastic sealing ring located in a gap between a radially exterior surface of the stationary annular sealing element and a radially interior surface of the rear housing part or sealing retainer mounted in the rear housing part, and a rotatable annular elastic sealing ring configured to be located in a gap between a radially exterior surface of the rotatable annular sealing element and a radially interior surface of the impeller or drive shaft. Thereby, improved access and thus improved cleaning of the sealing arrangement is enabled.

In some example embodiments, that may be combined with any one or more of the above-described embodiments, the disclosure also relates to a centrifugal pump assembly comprising a centrifugal pump housing as defined in any of the preceding passages above, a drive shaft extending axially through the drive shaft opening of the rear housing part, and an impeller accommodated in the pump housing and rotationally secured to the axially extending drive shaft.

In some example embodiments, that may be combined with any one or more of the above-described embodiments, the centrifugal pump assembly further comprises a motor operably connected to an axially extending drive shaft.

In some example embodiments, that may be combined with any one or more of the above-described embodiments, the plurality of stationary protrusions are located in a space between a rear side of the impeller and at least one of the stationary and/or rotatable annular seal elements, specifically in a space defined partly by an annular recess in the rear housing part, a rear side of the impeller and at least one of the stationary and/or rotatable annular seal elements. Thereby, improved turbulence of the working fluid and cleaning agent and thus improved cleaning is provided in the vicinity of the sealing arrangement.

In some example embodiments, that may be combined with any one or more of the above-described embodiments, the plurality of stationary protrusions are located in a flow path extending in a radial direction from an outer circumference of the impeller to at least one of the stationary and/or rotatable annular seal elements via the rear side of the impeller, in particular in a region next to said stationary and/or rotatable annular seal elements. Thereby, improved turbulence of the working fluid and cleaning agent and thus improved cleaning is provided in the vicinity of the sealing arrangement.

In some example embodiments of the method for cleaning a sealing arrangement of a centrifugal pump in place, that may be combined with any one or more of the above-described embodiments of the centrifugal pump housing and/or the centrifugal pump assembly, the centrifugal pump housing and/or the centrifugal pump assembly is as defined in any of the preceding passages above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The pump housing, centrifugal pump and pump assembly according to the disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
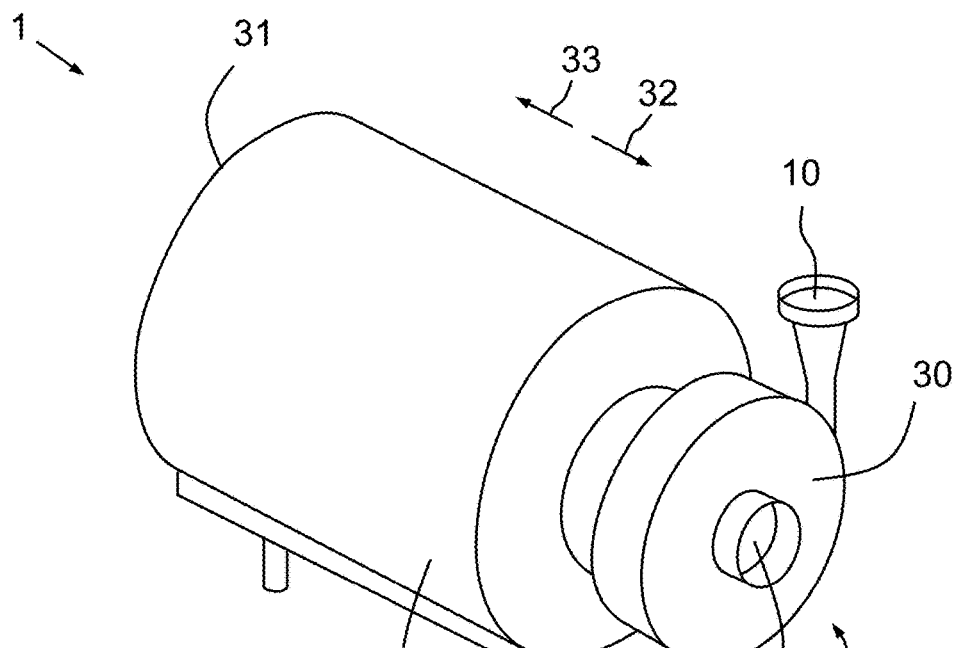
FIG. 1 shows schematically a perspective view of an example embodiment of the pump assembly
Figure 2:
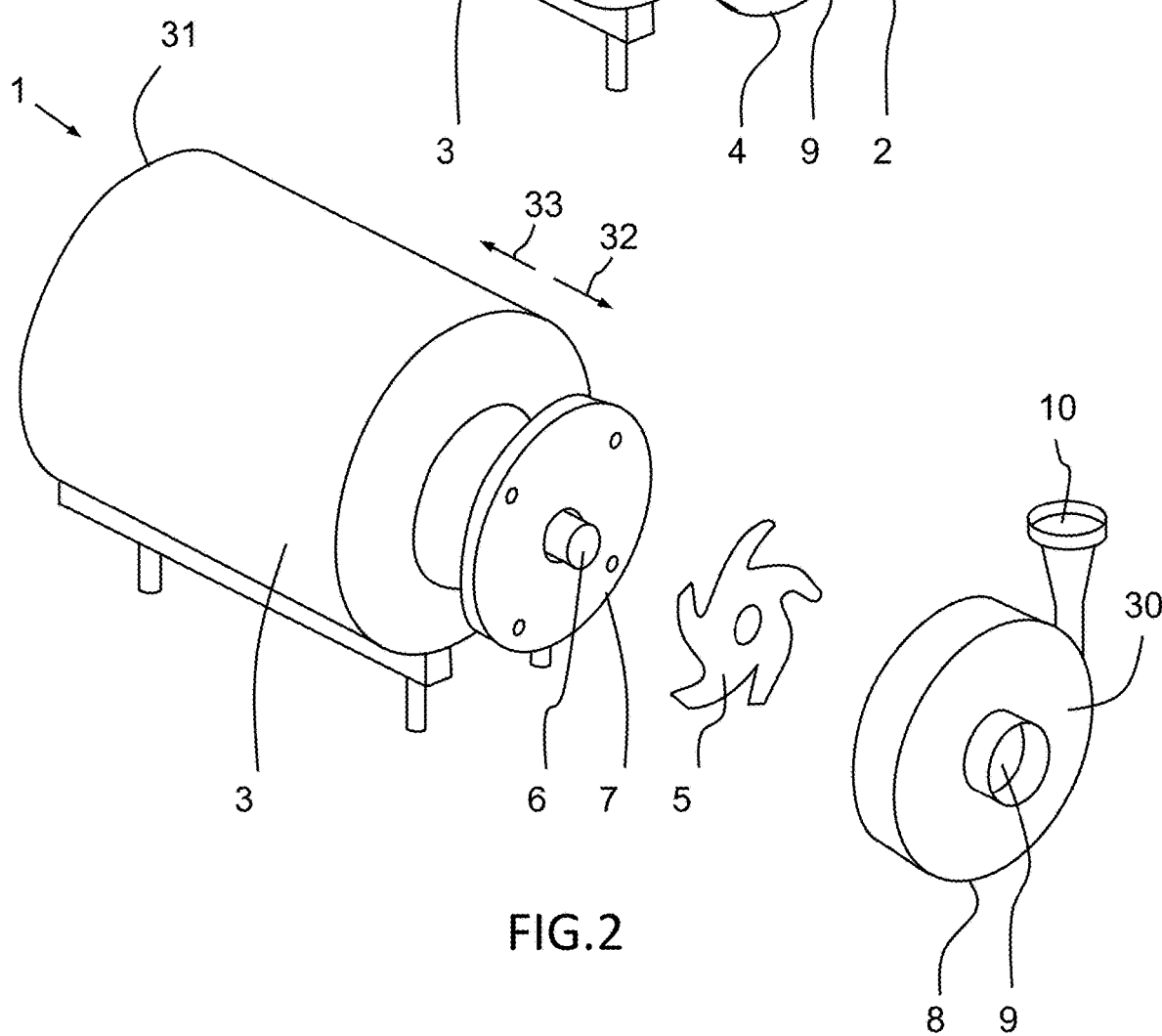
FIG. 2 shows schematically the same pump assembly in exploded view.

FIG. 1 schematically shows a perspective view of a centrifugal pump assembly 1 comprising a centrifugal pump 2 operably connected to a propulsion motor 3, such as for example an electric motor. FIG. 2 schematically shows an exploded view of the centrifugal pump assembly 1 of FIG. 1.

The centrifugal pump may include a stationary pump housing 4 accommodating a rotatable impeller 5, wherein the pump housing is composed of at least a stationary rear housing part 7 having a drive shaft opening for receiving the drive shaft 6, and a stationary front housing part 8 directly or indirectly attachable to the rear housing part 7 for forming a pump chamber. FIG. 2 also shows that the impeller 5 may be rotationally secured to an axially extending drive shaft 6, which may be operably connected to an output shaft of the motor 3. The pump housing 4 has a fluid inlet opening 9 and a fluid outlet opening 10.

A centre axis 63 of the drive shaft 6 defines an axial direction of the pump and pump housing. Furthermore, the pump, pump assembly and pump housing has a front side 30, a rear side 31, a forwards direction 32 parallel with the axial direction, and a rearwards direction 33 parallel with the axial direction.

Figure 3:
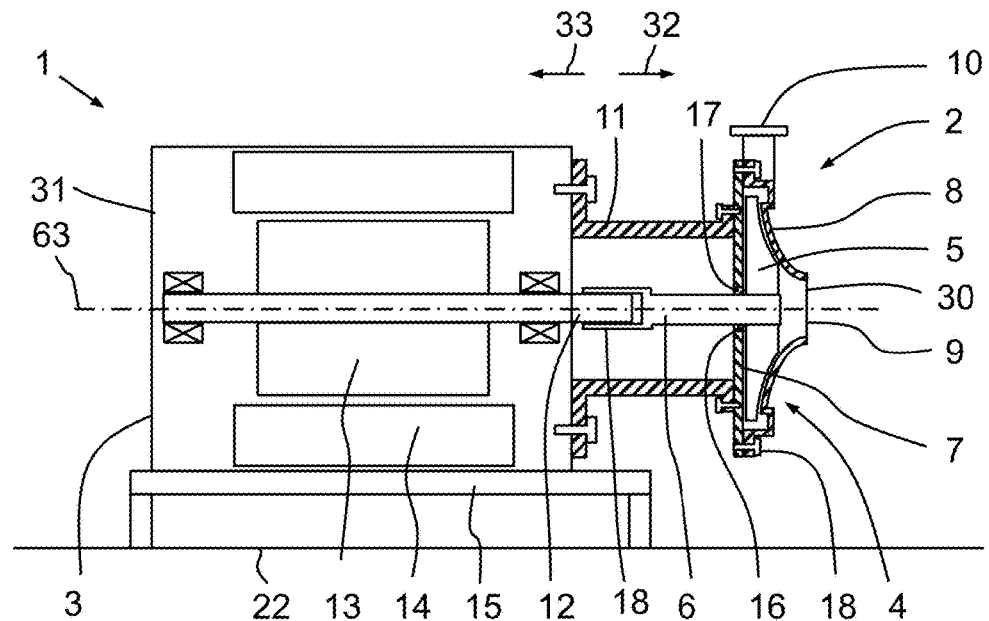
FIG. 3-4 show schematically side views of the alternative pump assemblies.

FIG. 3 schematically shows a cross-section a further example embodiment of the pump assembly 1 according to the disclosure. In this example embodiment, the pump housing 4 is supported and rotationally secured to a stationary housing of the motor, for example indirectly via an intermediate support structure 11 as illustrated in FIG. 3, or simply directly attached to the motor housing via integrated attachment arrangement.

The electric motor 3 may for example have a centrally arranged rotatable output shaft 12 carrying a rotatable rotor 13, which is installed within a stationary stator 14. The motor 3 may for example be mounted on a support structure 15 for enabling stable and reliable installation of the pump assembly on a support surface.

The centrifugal pump housing 4 is mounted to the motor housing and is composed of the rear housing part 7 and the front housing part 8 connected to each other by means of suitable clamping devices 18, such as screws. The pump housing may alternatively be composed of additional parts.

The front and rear housing parts 8, 7 jointly define an internal cavity defining a pump chamber or pumping cavity configured to accommodate the impeller.

The impeller 5 is mounted and rotationally locked to the axially extending drive shaft 6, which is connected and rotationally locked to the output shaft 12 of the motor for rotation of the impeller 5 via a shaft coupling 19. The drive shaft 6 and motor output shaft 12 may alternatively be made on one piece.

The rear housing part 7 is here attached and supported by the motor 3 via the intermediate support structure 11. The rear housing part 7 has a drive shaft opening 16 for enabling the drive shaft 6 to pass through the rear housing part 7 to the impeller 5. Alternatively, or in combination, the impeller 5 may have an integrated shaft portion that extends through the drive shaft opening 16 for subsequent connection to the output shaft 12 via a suitable shaft coupling.

The pump housing 4 comprises a sealing arrangement 17 for sealing the drive shaft opening 16 for preventing leakage of fluid from the pump chamber out through the drive shaft opening 16. The sealing arrangement 17 may thus be deemed being arranged in an annular space defined radially outwards by the inner annular surface of the drive shaft opening 16 and radially inwards by an outer annular surface of the drive shaft and/or shaft portion of impeller 5.

Figure 4:
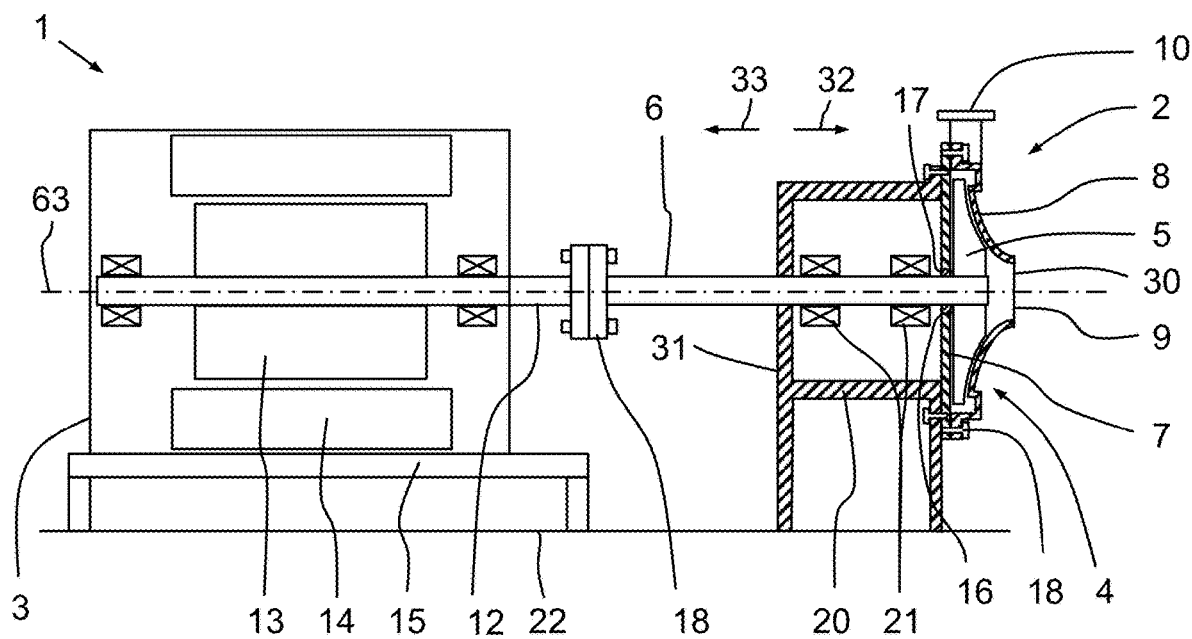

A further example embodiment of the pump assembly is schematically shown in FIG. 4, wherein the centrifugal pump 2 is self-supporting and merely coupled to the motor 3 via the drive shaft 6.

Specifically, the centrifugal pump 2 may include a support housing 20 having bearings 21 for rotatably supporting the drive shaft 6. The support housing 20 may be configured for enabling stable and reliable installation of the pump 2 on a support surface 22.

The pump housing 4 is stationary mounted on the support housing 20 and the drive shaft 6 of the pump is be coupled and rotationally locked with the output shaft 12 of the motor 3.

The example embodiment of FIG. 4 may be specifically advantageous when the pump is relatively heavy and/or large, thereby rendering mounting on the motor housing less suitable.

Figure 5A:
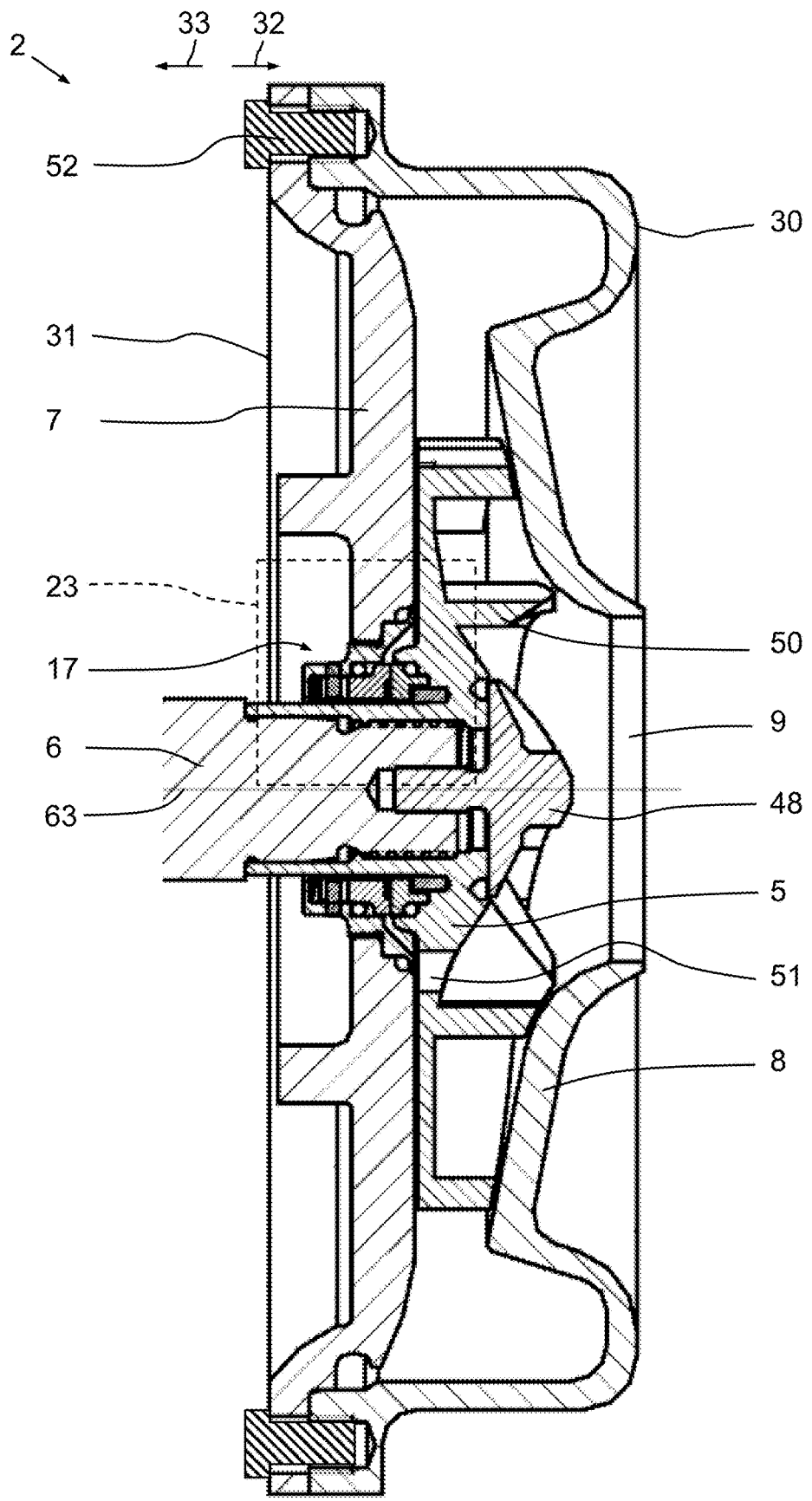
FIG. 5A-E show schematically various views of an example embodiment of the pump housing and impeller.
Figure 5B:
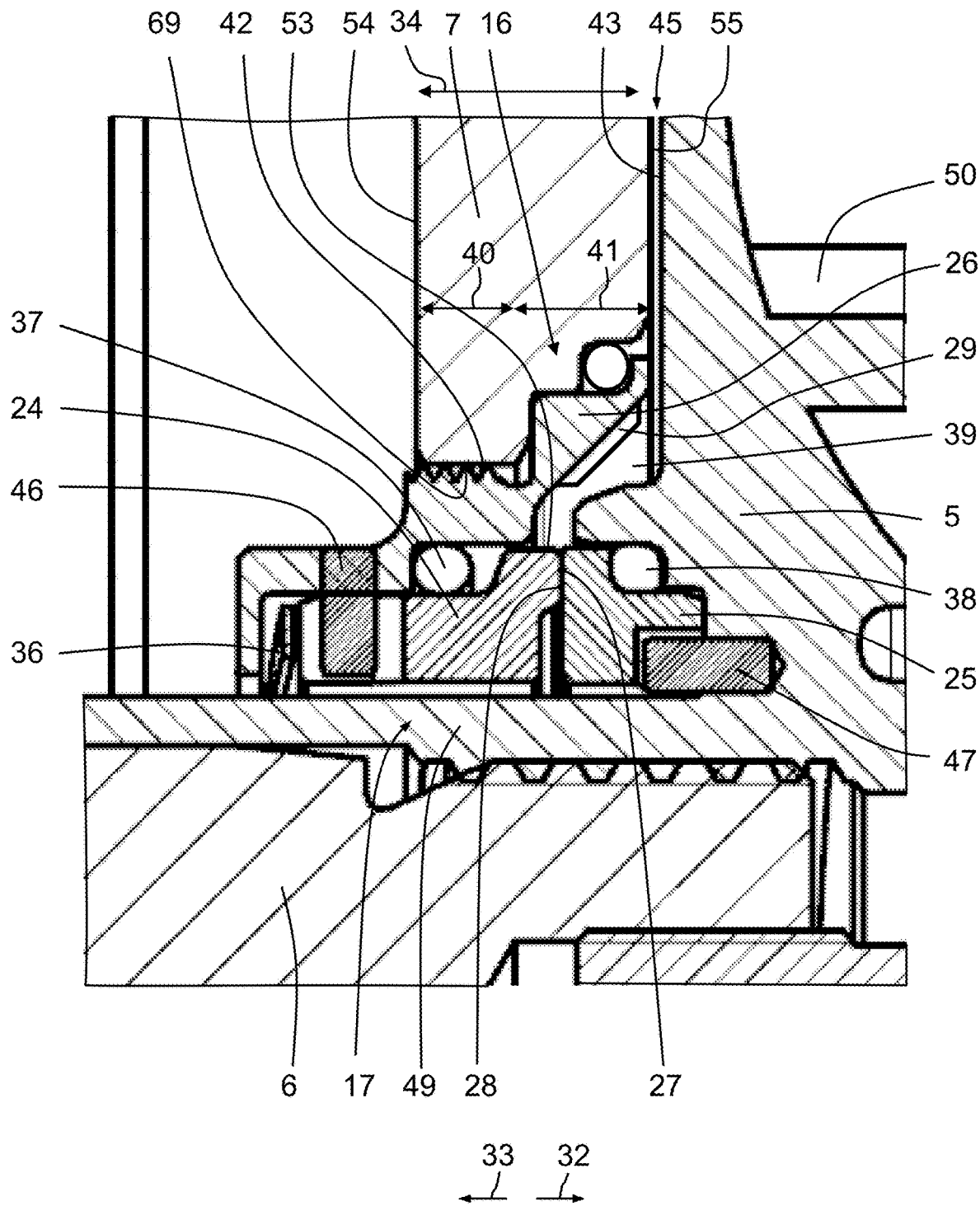

FIG. 5A shows a cross-sectional view of an example embodiment of the centrifugal pump 2 according to the disclosure, and FIG. 5B shows a magnified illustration of the dashed-line box 23 in FIG. 5A.

With reference to FIGS. 5A-5B, the disclosure relates to a centrifugal pump housing 4 configured to accommodate an impeller 5 mounted on an axially extending drive shaft 6 operably connected to a motor 3 for rotation of the impeller 5. The pump housing 4 comprises a rear housing part 7 having a rear side 54, a front side 55 and drive shaft opening 16 for receiving the drive shaft 6, a front housing part 8 attached to the rear housing part 7 for forming a pump chamber, and a sealing arrangement 17 for sealing the drive shaft opening 16 for preventing leakage of fluid from the pump chamber out through the drive shaft opening 16.

The front and rear housing parts 8, 7 may for example be mutually connected by means of plurality of threaded fasteners 52 distributed along the periphery of the pump housing 4.

The sealing arrangement 17 comprises a stationary annular seal element 24 mounted in and rotationally locked to a sealing retainer 26, which is mounted in the rear housing part 7, wherein the stationary annular seal element 24 has a stationary plane seal surface 27 facing forwards in the axial direction, i.e. in the forwards direction 32. The sealing arrangement further comprises a rotatable annular seal element 25 configured to be mounted on and rotationally locked to the impeller 5 or to the drive shaft 6, wherein the rotatable annular seal element 25 has a rotatable plane seal surface 28 facing rearwards in the axial direction, i.e. in the rearwards direction 33, and configured to sealingly abut against the stationary plane seal surface 27.

Each of the stationary and rotatable annular seal elements 24 are generally made in one-piece of a rigid material having high wear resistance for enabling a reliable and long-term leak-proof sealing connection.

The stationary and rotatable plane seal surfaces 27, 28 may be arranged in a plane perpendicular to the axial direction.

The sealing retainer 26 may be a one-piece. Alternatively, the sealing retainer may be a multiple-piece retainer composed of a plurality of parts. The sealing retainer 26 may be made of for example plastic or metal material.

The sealing retainer 26 may be fastened and rotationally locked to the rear housing part 7, for example by means of a threaded connection. The threaded connection may comprise a radially outer threaded portion 42 of the sealing retainer 26 that is threadingly engaged in a radially inner threaded portion 69 of the rear housing part 7.

An advantage of installing the stationary annular seal element 24 in a sealing retainer is that various types of sealing arrangements may be cost-effectively provided using a common rear housing part 7, which is larger and most costly to manufacture. In other words, several different types of sealing arrangements, such as single seal and double seal arrangements, flushed seal and non-flushed seal, may be offered for sales while only a single rear housing part 7 must be manufactured and stored at suitable locations, because said different types of sealing retainers are compatible with a common rear housing part 7. Furthermore, in case a user wants to upgrade a sealing arrangement of an existing pump, the user may simply acquire a new sealing retainer with associated sealing arrangement, and subsequently replace the previous sealing arrangement with the new sealing retainer, while keeping the rear housing part 7, thereby reducing cost and environmental impact. A seal replacement kit may for example include a new sealing retainer 26 with seal elements 24, 25 and a new impeller 5.

The fact that stationary plane seal surface 27 faces in the forwards direction 32 and the rotatable plane seal surface 28 faces in the rearwards direction 33 has the effect that product fluid merely comes in contact with primarily a radially exterior side 53 of the stationary and rotatable seal elements 24, 25. This may be deemed advantageous because product fluid and/or cleaning agent more easily reaches the sealing area and the sealing area has a larger surface area, such that an improved flush of the sealing area may thus be accomplished.

The stationary seal element 24 may be rotationally locked to the sealing retainer 26 by means of stationary pin 46, and the rotatable seal element 25 may be rotationally locked to the impeller 5 by means of an impeller pin 47.

A threaded member 48, such as a screw, may engage in an axially extending internally threaded hole in the drive shaft 6 for clamping the impeller on the axial end of the drive shaft 6.

The impeller 5 further includes pumping blades 50 in a front side of the impeller 5. Furthermore, in some example embodiments, the impeller may have one or more through holes 51 extending in the axial direction for enabling working fluid and cleaning agent to more easily reach the area of the sealing arrangement 17, specifically onto the outer diameter of the stationary and rotatable annular seal elements 24, 25, for further improved cleaning and contamination-free operation of the pump.

The impeller may have a sleeve portion 49 extending over an axial end portion of the drive shaft 6, and the sealing arrangement 17 may be on a radially outer side of said sleeve portion 49 and a radially inner side of the sealing retainer 26.

In the example embodiment of FIG. 5B, the sealing arrangement 17 comprises a mechanical spring 36 arranged to urge the stationary annular seal element 24 in the axial direction towards the rotatable annular seal element 25, i.e. in the forwards direction 32, while the rotatable annular seal element 25 for example may be axially supported by the impeller 5. Thereby, the necessary axial sealing force may be accomplished between stationary and rotatable plane seal surfaces 27, 28.

Alternatively, mechanical spring 36 may be arranged to urge the rotatable annular seal element 25 in the axial direction towards the stationary annular seal element 24, i.e. in the rearwards direction 33, while the stationary annular seal element 25 for example may be axially supported by the sealing retainer 26 or the rear housing part 7. Thereby, the necessary axial sealing force may be accomplished between stationary and rotatable plane seal surfaces 27, 28.

In the example embodiment of FIG. 5B, the sealing arrangement 17 further comprises a stationary annular elastic sealing ring 37, for example an O-ring, located in a gap between a radially exterior surface of the stationary annular sealing element 24 and a radially interior surface of the sealing retainer 26, which is mounted in the rear housing part 7.

The sealing arrangement 17 further comprises a rotatable annular elastic sealing ring 38 configured to be located in a gap between a radially exterior surface of the rotatable annular sealing element 25 and a radially interior surface of the impeller 5 or drive shaft 6.

The pump housing 4 further comprises a plurality of stationary protrusions 29 integrally formed in the sealing retainer 26. The plurality of stationary protrusions 29 are located in or adjacent to the drive shaft opening 16 of the rear housing part 7, and the plurality of stationary protrusions 29 are configured and arranged for increasing the turbulence of a flow of product fluid in the pump housing adjacent to the sealing arrangement. Increased turbulence generally results in reducing dead spaces in pump chamber, i.e. spaces with low fluid flow, where product fluid may accumulate and/or foul. Moreover, cleanability is also improved by reduced dead spaces, thereby providing improved cleaning of in particular the sealing arrangement.

Depending on the design of the rear housing part 7 and drive shaft opening 16, the plurality of stationary protrusions 29 may be located in said drive shaft opening 16 of the rear housing part 7, i.e. within an annular space defined by a radially inner surface of the rear housing part 7 defining the drive shaft opening 16. In other words, the plurality of stationary protrusions 29 may be located within an annular space defined by an axial length 34, as showed in 5B.

However, depending on the design of the rear housing part 7 and drive shaft opening 16, the plurality of stationary protrusions 29 may alternatively be located adjacent to the drive shaft opening 16 of the rear housing part 7, but still providing improved turbulent flow within the area of the sealing arrangement.

Figure 5C:
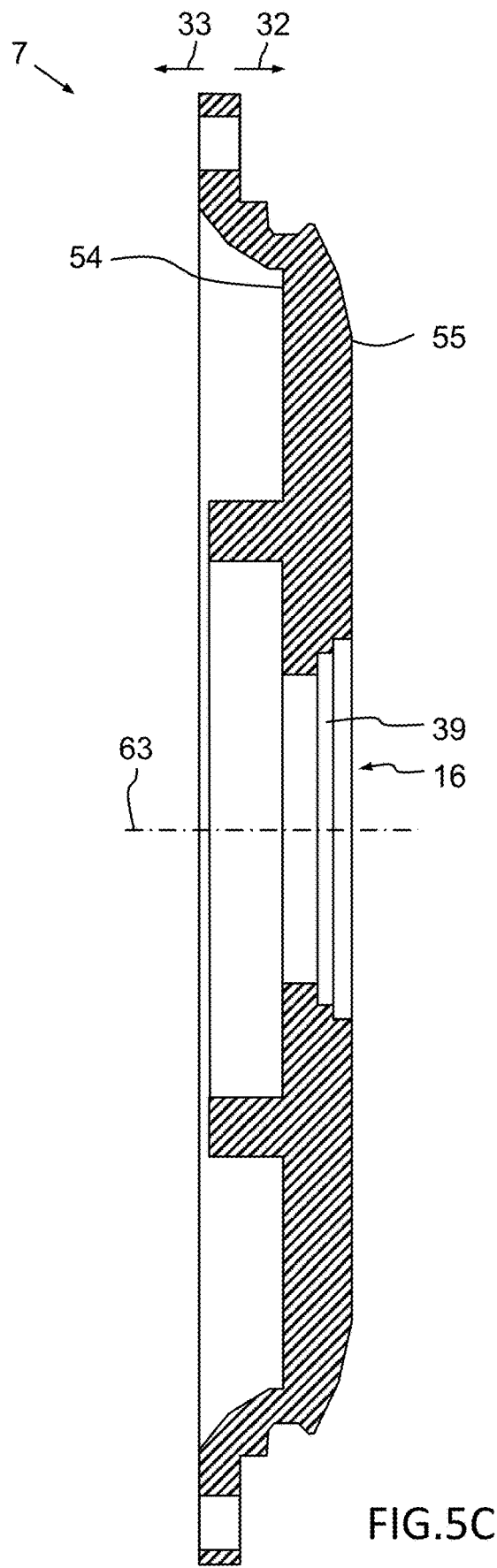
Figure 5D:
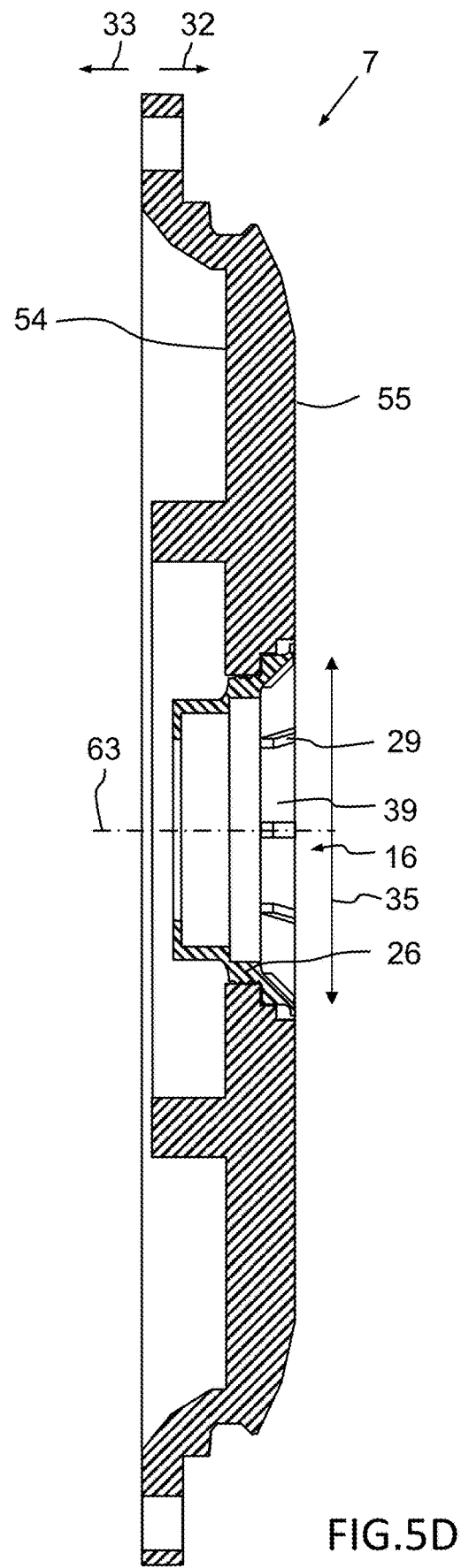

FIG. 5C shows schematically a cross-section of the rear housing part 7 of the example embodiment of FIG. 5A without a mounted sealing retainer 24 and sealing arrangement 17, and FIG. 5D shows schematically the same cross-section of the rear housing part 7 of the example embodiment of FIG. 5A with a mounted sealing retainer 24, but still without the sealing arrangement 17. The maximal diameter 35 of the drive shaft opening 16 is illustrated in FIG. 5D.

With reference to for example FIG. 5B, the sealing retainer 26 defines an annular recess 39, specifically a stepwise or continuously conical annular recess 39, located at or adjacent and/or in connection to the drive shaft opening 16 of the rear housing part 7, and the plurality of stationary protrusions 29 are located in said annular recess 39. Thereby, a vivid and turbulent fluid flow is accomplished in the region of the sealing arrangement 17 for improved cleanability and low contamination level. The annular recess 39 is open in the forwards direction 32 for enabling improved flush access to the sealing arrangement by the cleaning agent or working fluid.

With reference to FIG. 5B, the drive shaft opening 16 of the rear housing part 7 may include a cylindrical portion 40 and an annular recess portion 41, arranged side by side in the axial direction of the pump housing 4. This arrangement is also schematically illustrated in magnified view in FIG. 5E, in which the cylindrical portion 40 and the annular conical recess portion 41 are clearly indicated by dashed-line rectangles.

Specifically, the drive shaft opening 16 of the rear housing part 7 may include a cylindrical portion 40 and an annular conical recess portion 41, which faces in the forwards direction 32 towards the impeller 5. The stationary annular seal element 24 may be located in the cylindrical portion 40 of the drive shaft opening 16 for enabling reliable and satisfactory sealing performance.

In the example embodiment of FIGS. 5A-E, the plurality of stationary protrusions 29 are located in said annular recess portion 41, in particular in said conical annular recess portion 41.

In other words, the annular sealing retainer 26 may be mounted in the drive shaft opening 16 of the rear housing part 7 and the stationary annular seal element 24 may be rotationally locked to the sealing retainer 26 and the sealing retainer 26 may include an annular conical recess portion 41 facing forwards towards the impeller 5 and the plurality of stationary protrusions may be located on a radially interior surface of said annular conical recess portion 41.

For example, with reference to FIG. 5B, the plurality of stationary protrusions 29 may be located in an annular space between a rear side 43 of the impeller 5 and at least one of the stationary and/or rotatable annular seal elements 24, 25. Specifically, the plurality of stationary protrusions 29 may be located in an annular space defined partly by the annular recess 39, the rear side 43 of the impeller 5 and at least one of the stationary and/or rotatable annular seal elements 24, 25.

According to a further example, the plurality of stationary protrusions 29 are located in a flow path 45 extending in a radial direction from an outer circumference 44 of the impeller 5 to at least one of the stationary and/or rotatable annular seal elements 24, 25 via the rear side 43 of the impeller 5, in particular in said flow path 45 in a region next to said stationary and/or rotatable annular seal elements 24, 25. The plurality of stationary protrusions 29 are thus located closer to the seal elements 24, 25 than the outer circumference 44 of the impeller 5, in particular at least two or three time closer to the seal elements 24, 25.

The plurality of stationary protrusions 29 may have various alternative designs for accomplishing the desired improvement in terms of turbulence and flush of the sealing arrangement 27. For example, FIGS. 6A-B, 7A-B and 8A-B show three alternative designs of the stationary protrusions 29 provided in the sealing retainer 26.

Figure 6A:
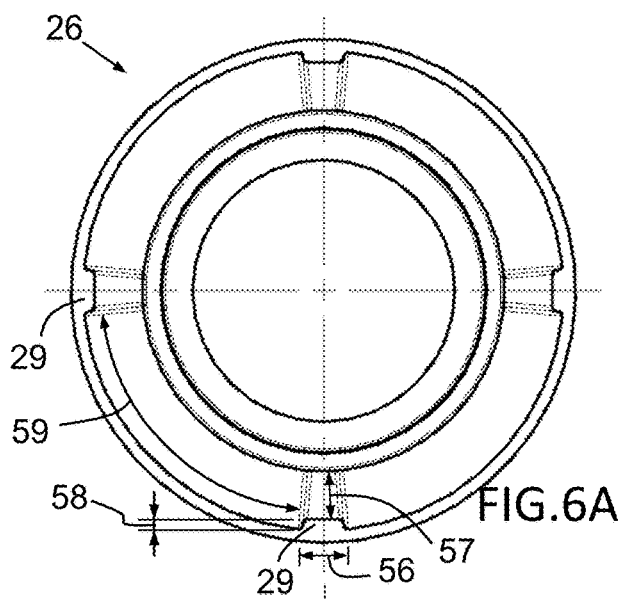
FIG. 6A-B show schematically a front view and perspective view of a first example embodiment of the sealing retainer.
Figure 6B:
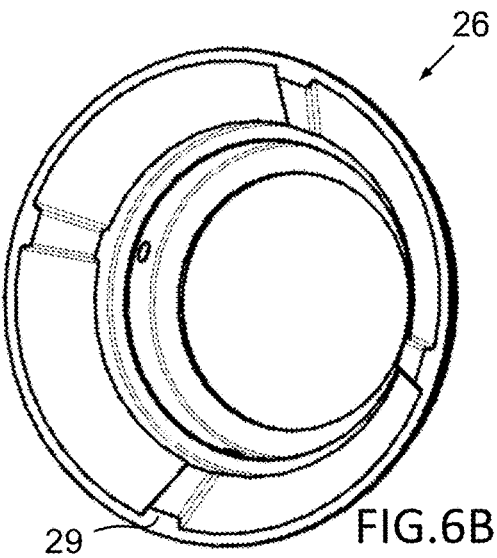

FIGS. 6A and 6B shows an example embodiment of the sealing retainer 26 in a front view and perspective view. In this example embodiment, the sealing retainer 26 includes four stationary protrusions 29 having an elongated form and extending in a radial and axial direction of the pump housing 4 for providing a more turbulent flow in the region of the sealing arrangement 17.

Figure 5E:
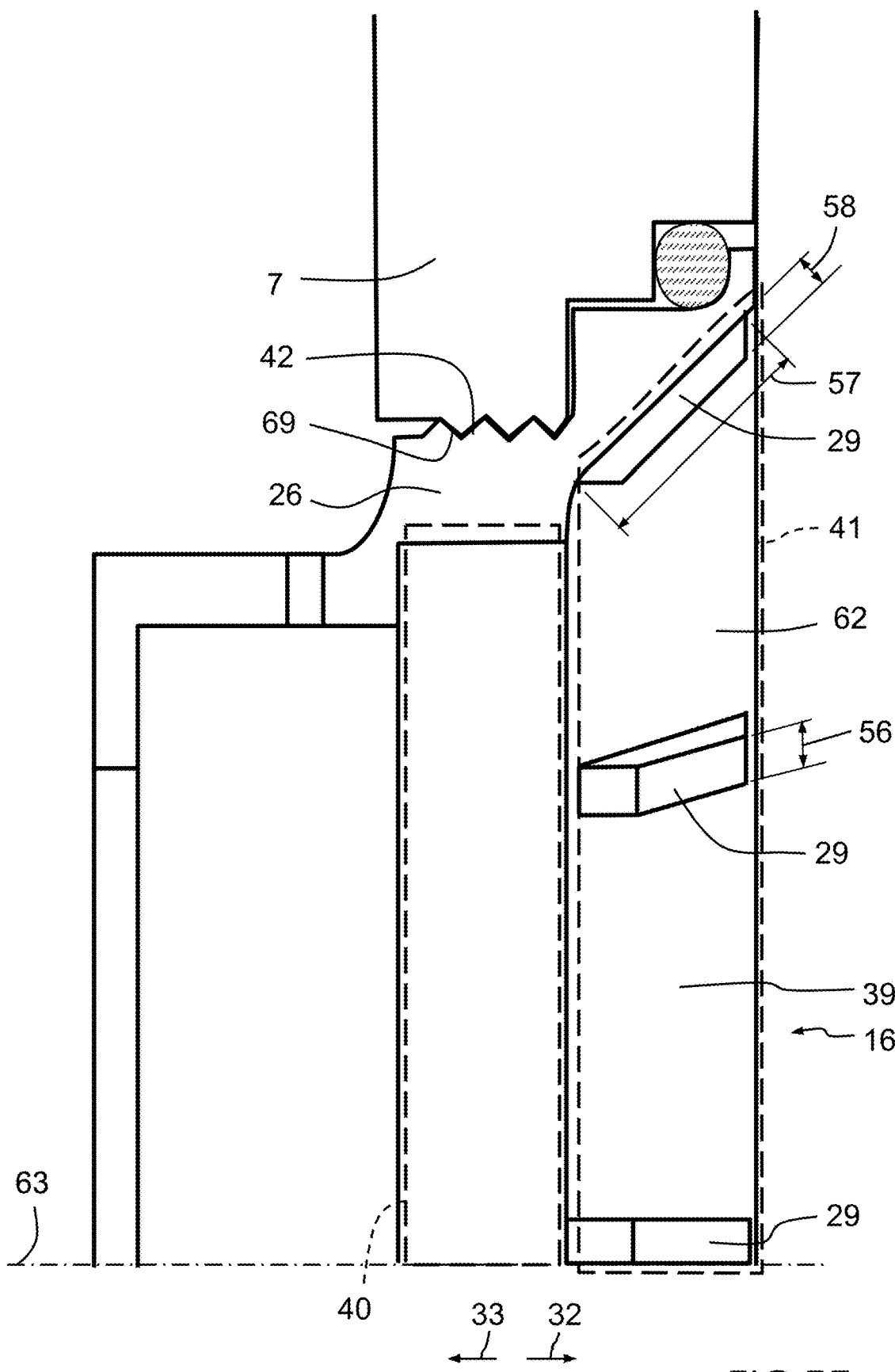

With reference to FIGS. 5E and 6A, the elongated stationary protrusions 29 may have a certain width 56 parallel to a circumferential direction of the housing 4, a certain length 57 in a direction perpendicular to the width direction, and a certain height 58 perpendicular to both the width and length directions 56, 57. The length 57 of the elongated protrusion 29 is measured in the longitudinal direction of the protrusion 29.

The maximal length 57 of the elongated protrusion 29 may for example be at least two times larger, specifically at least six times larger, than a maximal width 56 of the elongated protrusion 29.

Depending on the design of the rear housing part 7 and/or sealing retainer 26, as well as the drive shaft opening 16, the stationary protrusions may protrude, i.e. having a height 58, of about 0.5-5 mm, measured in a direction perpendicular to the adjacent flat surface from which the protrusions 29 projects.

A width 56 of an elongated stationary protrusion 29 is generally always less than a maximal circumferential length 59 between neighbouring protrusions 29, specifically at least less than half of the maximal circumferential length 59 between neighbouring protrusions 29, and more specifically at least less than 25% of the maximal circumferential length 59 between neighbouring protrusions 29. Such relatively narrow protrusions 29 provide excellent increase in the level of turbulence of the working fluid or cleaning agent in the area of the sealing arrangement 17.

The protrusions 29 may for example extend in a continuous manner over the length 57 the protrusion 29. Consequently, the plurality of stationary protrusions 29 in certain example embodiments correspond to a plurality of elongated vanes distributed around a circumference of an interior surface of the sealing retainer 26.

In the example embodiment of FIG. 6A, the direction of elongation of the plurality of elongated vanes 29 is perpendicular to an intended direction of rotation of the impeller 5. This arrangement of the vanes 29 is consistent with the vanes of FIG. 5E, which shows that the direction of elongation of the vanes 29 is perpendicular to the rotational direction of the impeller 5, while having an axial component and a radial component. In other words, the vanes 29 may, due to their location on a conical surface 62 of the recess portion 41 of the sealing retainer 26, be inclined radially outwards while still aligned with a plane coinciding with the centre axis 63.

The width 56 of the vane 29 may be constant over a main portion of the length 57 of the vane, or at least not differing more than 30% over a main portion of the length 57 of the vane 29.

In the example embodiment of FIG. 6A, the sealing retainer 26 includes four stationary protrusions 29. However, in alternative example embodiments, the sealing retainer may include about 2-20 protrusions or vanes, specifically about 2-10 protrusions or vanes, and more specifically about 3-6 protrusions or vanes.

Figures 7A, 7C:
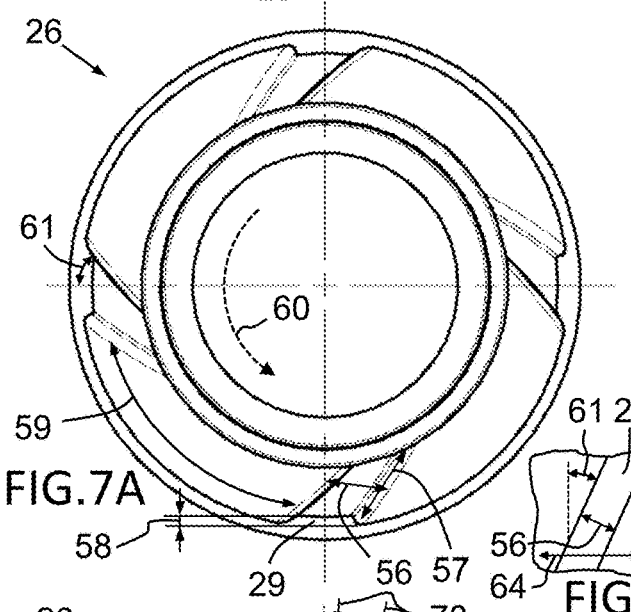
FIG. 7A-C show schematically a front view, a perspective view and a magnification view of a second example embodiment of the sealing retainer.
Figure 7B:
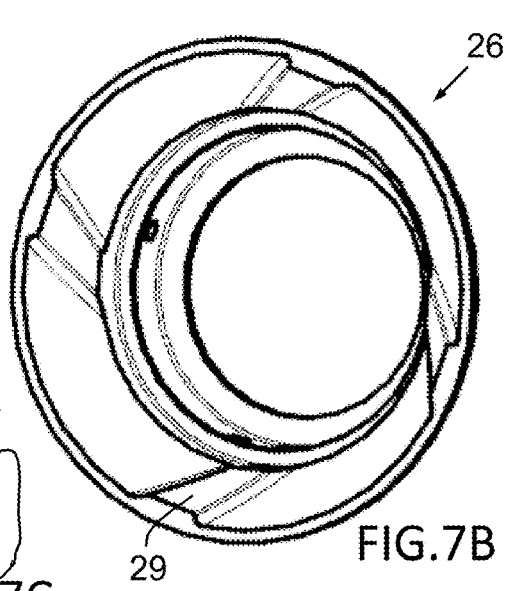

In some example embodiments, the elongated protrusions or vanes 29 may be inclined with respect to an axial plane, i.e. a plane coinciding with the centre axis 63, for forming a helical shape, as schematically illustrated in FIGS. 7A-B.

In other words, the sealing retainer 26 includes four stationary protrusions or vanes 29 having an elongated form and extending inclined with respect to the radial and/or axial direction, i.e. in a helical or spiral manner concentric about a centre axis of the drive shaft 6, for guiding a circulating working fluid towards the sealing arrangement 17. Hence, a rotating impeller 5 causing a working fluid or cleaning agent to circulate along arrow 60 in FIG. 7A within or adjacent the sealing retainer 26 of a centrifugal pump 2 will be guided inwards towards the sealing arrangement 17 by means of the inclined vanes 29 of FIGS. 7A-B.

The helically extending stationary protrusions or vanes 29 may have a helix angle 61 in the range of for example 1-75°, specifically in the range of 10-45°, for enabling both turbulent flow and guidance in the rearwards direction 33 towards the sealing arrangement 17.

With reference to FIG. 7A, as well as a corresponding top view of a stationary protrusion in FIG. 7C, the elongated stationary protrusions or vanes 29 may have a certain width 56 inclined to a circumferential direction 64 of the housing, i.e. inclined to an intended direction of rotation 65 of the impeller. Moreover, the elongated stationary protrusions or vanes 29 may also have a certain length 57 in a direction perpendicular to a width direction of the elongated protrusion 29, and a certain height 58 perpendicular to both the width and length directions, and a maximal length 57 of the elongated protrusion is at least two times larger, specifically at least six times larger, than a maximal width 56 of the elongated protrusion.

That is to say, the plurality of elongated vanes 29 extend inclined with respect to the intended direction of rotation 65 of the impeller 5 for guiding a circulating working fluid towards the sealing arrangement. Furthermore, the vanes 29 may have a width 56 with a major component in a circumferential direction 64 of the housing, and a length 57 with a major component in a direction perpendicular to said circumferential direction 64, and wherein a maximal length 57 of said vanes 29 is at least two times larger, specifically at least four times larger, than a maximal width 56 of said vanes 29.

Depending on the design of the rear housing part 7 and/or sealing retainer 26, as well as the drive shaft opening 16, the stationary protrusions of the embodiment of FIG. 7A may protrude, i.e. having a height 58, of about 0.5-5 mm, measured in a direction perpendicular to the adjacent flat surface from which the protrusions 29 projects.

A width 56 of an elongated stationary protrusion or vane 29 is generally always less than a maximal circumferential length 59 between neighbouring protrusions 29, specifically at least less than half of the maximal circumferential length 59 between neighbouring protrusions 29, and more specifically at least less than 25% of the maximal circumferential length 59 between neighbouring protrusions 29. Such relatively narrow protrusions 29 provide excellent increase in the level of turbulence of the working fluid or cleaning agent in the area of the sealing arrangement 17.

The width 56 of the vane 29 may be constant over a main portion of the length 57 of the vane, or at least not differing more than 30% over a main portion of the length 57 of the vane 29.

In the example embodiment of FIG. 7A, the sealing retainer 26 includes four stationary protrusions 29. However, in alternative example embodiments, the sealing retainer may include about 2-20 protrusions or vanes, specifically about 2-10 protrusions or vanes, and more specifically about 3-6 protrusions or vanes.

Still a further example embodiment of the elongated protrusions 29 is described below with reference to FIGS. 8A-B, wherein the plurality of stationary protrusions 29 correspond to a plurality of elongated steps distributed around a circumference of an interior surface of the sealing retainer 26, wherein at least one of the steps 29 is facing away from an intended direction of rotation 65 of the impeller 5, i.e. facing in a direction 66 substantially opposite to an intended direction of rotation 65 of the impeller 5.

The term "step" herein refers to a sudden increase in height of the interior surface of the sealing retainer 26 in a circumferential direction 65 of the housing. For example, a wall thickness 70 of the sealing retainer 26 may change significantly in the area of the step, as illustrated in FIG. 8A. In other words, in the intended direction of rotation 65 of impeller 5, the interior surface 62 between two consecutive steps may have a gradual decrease in height over certain distance, and then a stepwise increase in height, thereby defining a step.

The afore-described vane may be deemed including at least two steps, a first positive step defining a first edge of the vane, and a second negative step defining a second edge of the vane.

Furthermore, the fact that the steps 29 may be arranged facing in a direction 66 substantially opposite to, or inclined to an intended direction of rotation 65 of the impeller 5, fluid circulating in the pump chamber will be guided in the rearwards direction 24 towards the sealing arrangement 17 when encountering said steps.

The plurality of elongated steps may extend perpendicular to an intended direction of rotation 65 of the impeller 5. Alternatively, the plurality of elongated steps may extend inclined with respect to an intended direction of rotation 65 of the impeller, as illustrated in FIGS. 8A-B, for guiding a circulating working fluid towards the sealing arrangement 17.

The steps 29 may have a width 56 with a major component in a circumferential direction of the housing, and a length 57 with a major component in a direction perpendicular to said circumferential direction, wherein a maximal length 57 of the step is at least three times larger, specifically at least six times larger, than a maximal width 56 of the step 29.

Figures 8A, 8C:
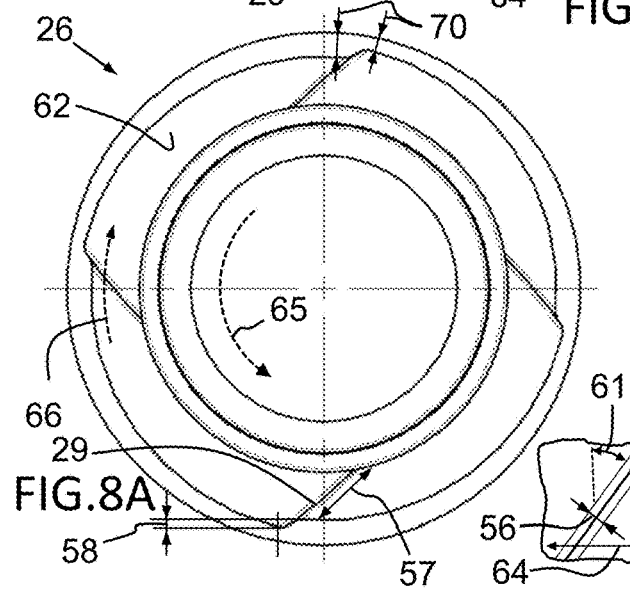
FIG. 8A-C show schematically a front view and perspective view of a third example embodiment of the sealing retainer.
Figure 8B:
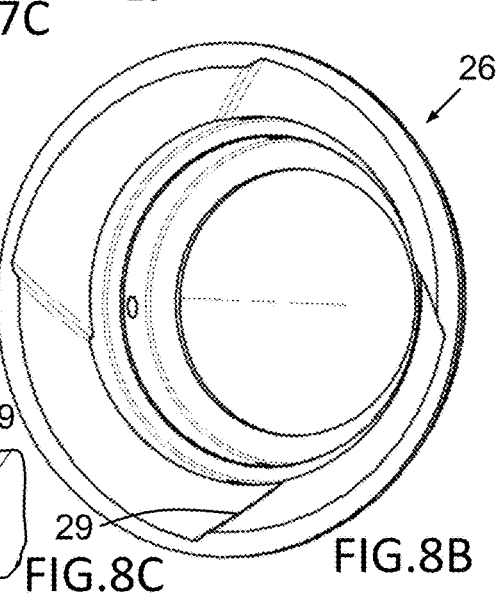

Depending on the design of the rear housing part 7 and/or sealing retainer 26, as well as the drive shaft opening 16, the steps of the embodiment of FIG. 8A may protrude, i.e. having a height 58, of about 0.5-5 mm, measured in a direction perpendicular to the adjacent flat surface.

A width 56 of an elongated step 29 is generally always less than a maximal circumferential length 59 between neighbouring steps 29, specifically at least less than half of the maximal circumferential length 59 between neighbouring steps 29, more specifically at least less than 25% of the maximal circumferential length 59 between neighbouring steps 29, and even and more specifically at least less than 10% of the maximal circumferential length 59 between neighbouring steps 29. Such relatively narrow steps 29 provide excellent increase in the level of turbulence of the working fluid or cleaning agent in the area of the sealing arrangement 17.

In the example embodiment of FIG. 8A, the sealing retainer 26 includes four stationary steps 29. However, in alternative example embodiments, the sealing retainer may include about 2-20 steps, specifically about 2-10 steps, and more specifically about 3-6 steps.

In the example embodiment of FIGS. 5A-E, the plurality of stationary protrusions 29 are located in a continuously conical annular recess portion 41 of the sealing retainer 26. However, the sealing retainer 26 may have alternative designs. For example, with reference to FIG. 9, the sealing retainer 26 may have a non-inclined shape in the annular recess portion 41, and the stationary protrusions 29 may be provided on the sealing retainer in said non-inclined region.

Figure 9:
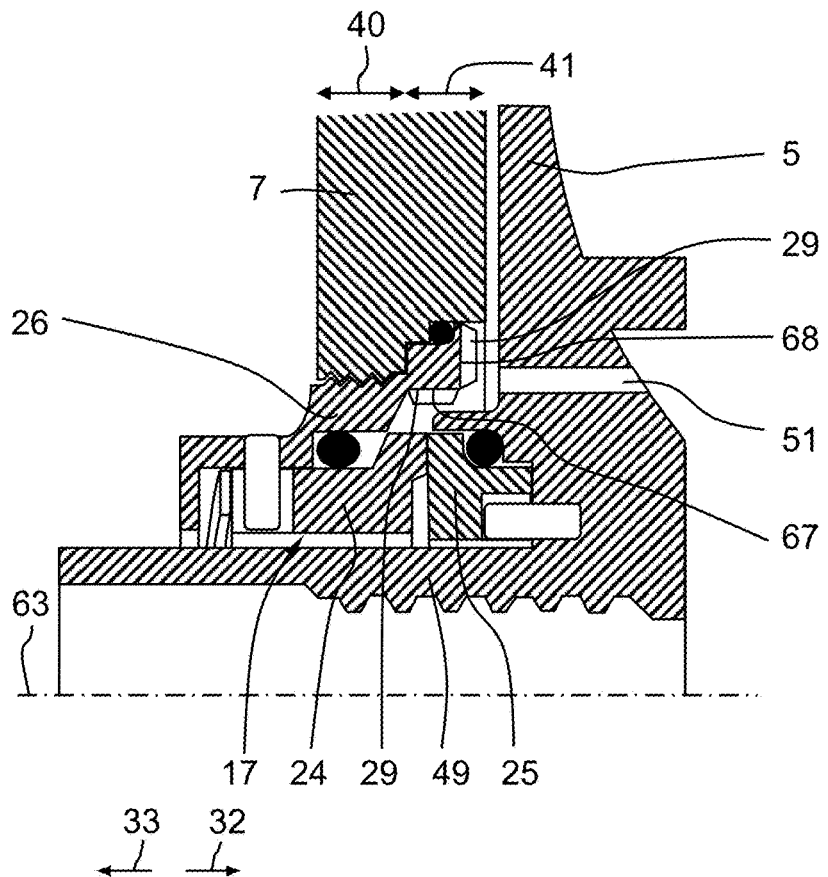
FIGS. 9, 10 and 12 shows schematically cross-sections of parts of some further example embodiments of the pump housing and impeller.

Specifically, in the example embodiment of FIG. 9, the annular recess portion 41 of the sealing retainer 26 includes primarily surfaces facing radially inwards and/or axially in the forwards direction 32, wherein the stationary protrusions 29 are provided on the radially inwards facing surface and/or said forwards directed surface.

The pump housing 4 may have many alternative designs. For example, with reference to FIG. 10, the sealing retainer may be designed to hold the stationary annular seal element 24, while the elongated protrusions are formed directly in the surface of the rear housing part 7 instead. This will essentially same positive effect on turbulence and cleaning efficiency, but possibly requiring replacement of the rear housing part 7 in case of upgrade of the pump housing 4.

In other words, the stationary annular seal element 24 may be mounted in and rotationally locked to the sealing retainer 26, which is mounted in the rear housing part 7. Furthermore, the plurality of stationary protrusions 29 may be integrally formed in the rear housing part and located in or adjacent the drive shaft opening of the rear housing part 7 for increasing the turbulence of a flow of product fluid in the pump housing adjacent to the sealing arrangement.

In addition, the rear housing part 7 may have an annular recess, specifically a conical annular recess, located at or adjacent to the drive shaft opening of the rear housing part, and the plurality of stationary protrusions are located in said annular recess.

Figure 10:
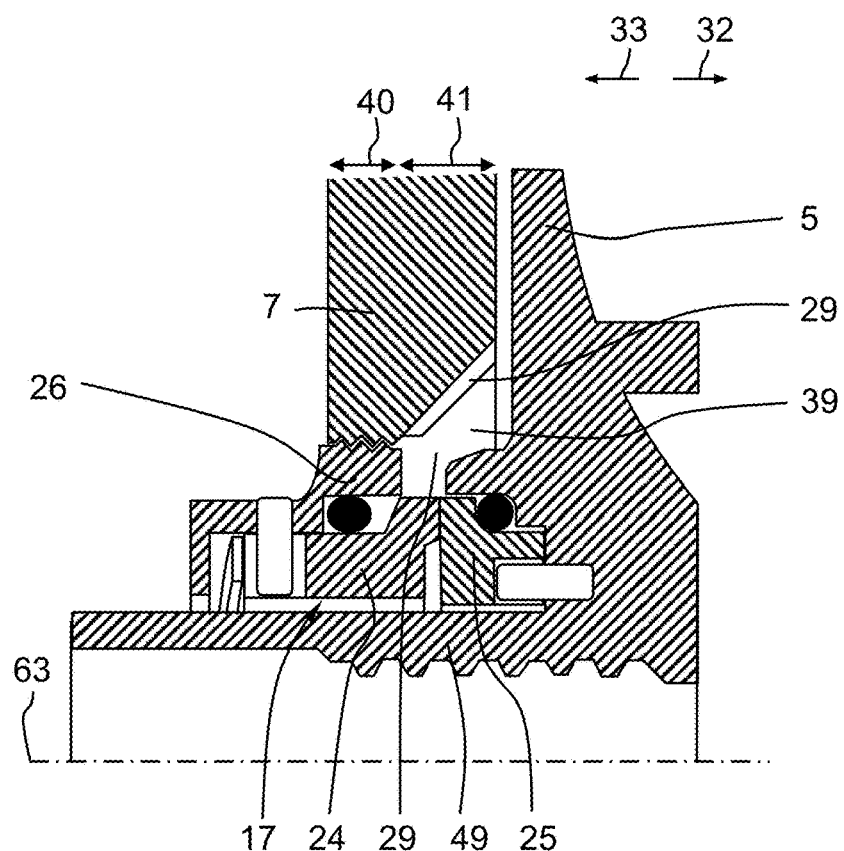

Although not showed in FIG. 10, the sealing arrangement 17 may further comprise a stationary annular elastic sealing ring 37, for example an O-ring, located in a gap between a radially exterior surface of the stationary annular sealing element 24 and a radially interior surface of the rear housing part 7.

Figure 11:
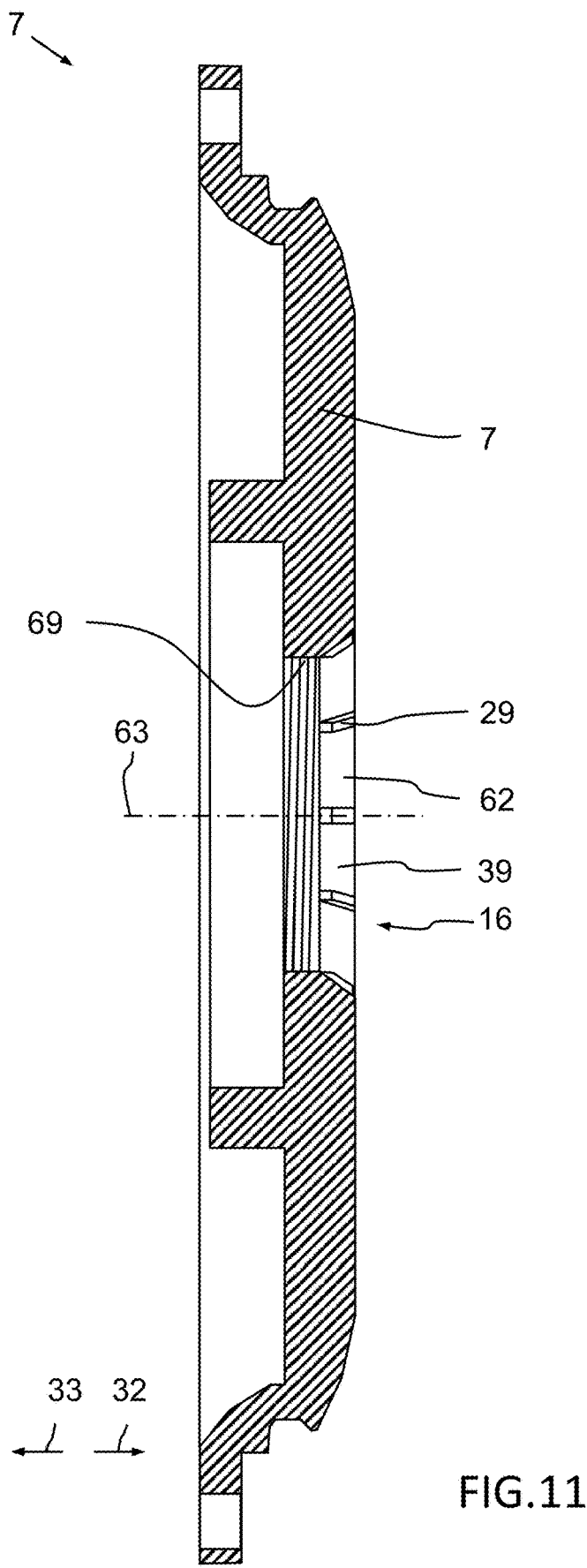
FIG. 11 shows a cross-section view of the rear housing part of the embodiment of FIG. 10.

FIG. 11 shows a cross-sectional view of the rear housing part and the drive shaft opening 16 of the embodiment of FIG. 10. The drive shaft opening includes a threaded portion 69 configured for being engaged by a threaded portion of the sealing retainer 26 or stationary annular seal element 24. The drive shaft opening further includes a conical recess portion 41 arranged side by side with the threaded portion 69 and configured to include the stationary protrusions 29.

Figure 12:
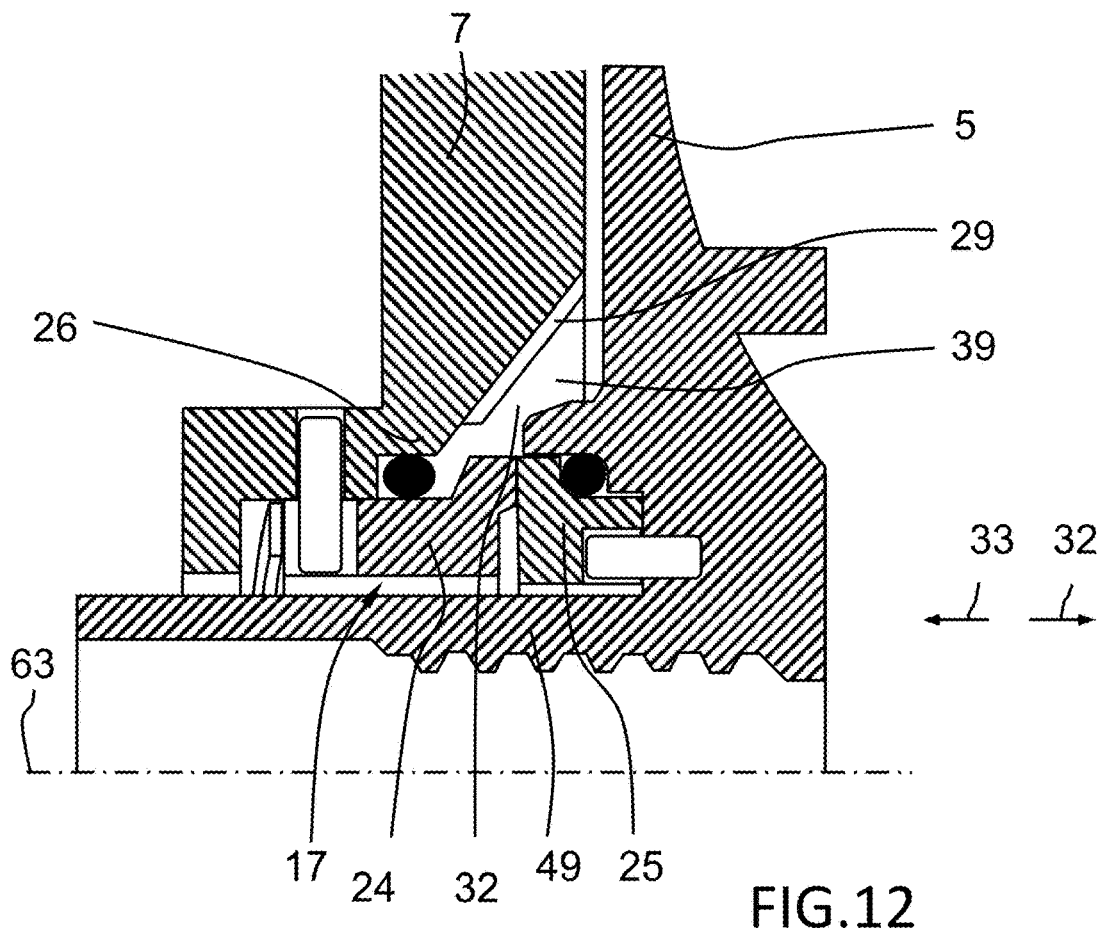

According to still a further example embodiment of the pump housing 4, as schematically illustrated in FIG. 12, the rear housing part 7 may have an integrally formed sealing retainer 26. Hence, the stationary annular seal element 24 may be mounted in and rotationally locked to the rear housing part. Furthermore, the pump housing may further comprise a plurality of stationary protrusions 29 integrally formed in the rear housing part and located in or adjacent the drive shaft opening of the rear housing part for increasing the turbulence of a flow of product fluid in the pump housing adjacent to the sealing arrangement.

Figure 13:
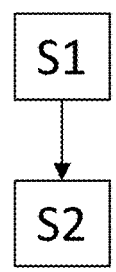
FIG. 13 shows the main steps of the method for cleaning a sealing arrangement of a centrifugal pump in place.

The present disclosure also relates to a method for cleaning a sealing arrangement of a centrifugal pump in place. With reference to FIG. 13, the method comprises a first step S1 of supplying a cleaning fluid to a fluid inlet opening of a pump housing of the centrifugal pump, wherein the centrifugal pump 2 comprises an axially extending drive shaft 6 operably connected to a motor 3 and an impeller 5 accommodated in the pump housing 4 and rotationally secured to the axially extending drive shaft 6, and wherein the pump housing comprises a rear housing part, a front housing part, and a sealing arrangement for sealing a drive shaft opening in the rear housing part.

The method further comprises a second step S2 of operating the motor for driving the impeller of the centrifugal pump, wherein cleaning fluid located between the rear housing part and the impeller is configured to interact with a plurality of stationary protrusions integrally formed in the rear housing part or in a sealing retainer mounted in the rear housing part, wherein the plurality of stationary protrusions are located in or adjacent the drive shaft opening of the rear housing part for increasing the turbulence of a flow of the cleaning fluid in the pump housing adjacent to sealing arrangement.

Pump housings, as well as pump assemblies and cleaning methods, having stationary protrusions 29 provided directly in the rear housing part 7, such as the embodiments shown in FIGS. 11 and 12, may include stationary protrusions 29 as well as other features described in conjunction with embodiments with a sealing retainer, as long as these features are not directly contradictory to a design without a sealing retainer. For example, in pump housings having stationary protrusions 29 provided directly in the rear housing part 7 (such as in pump housings without a sealing retainer), the rear housing part 7 may include the (conical) annular recess 39 and/or the cylindrical portion 40 and/or the annular recess portion 41 as described in conjunction with the embodiment shown in FIG. 5A-E. Further, in pump housings having stationary protrusions 29 provided directly in the rear housing part 7 (such as in pump housings without a sealing retainer), the rear housing part 7 may include the stationary protrusions, such as the vanes and steps, as described in conjunction with the embodiments shown in FIGS. 6A-8C.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| REFERENCE SIGNS |
|---|
| 1. Centrifugal pump assembly |
| 2. Centrifugal pump |
| 3. Motor |
| 4. Pump housing |
| 5. Impeller |
| 6. Drive shaft |
| 7. Rear housing part |
| 8. Front housing part |
| 9. Inlet opening |
| 10. Outlet opening |
| 11. Intermediate support structure |
| 12. Output shaft |
| 13. Rotor |
| 14. Stator |
| 15. Support structure |
| 16. Drive shaft opening |
| 17. Sealing arrangement |
| 18. Clamping device |
| 19. Shaft coupling |
| 20. Support housing |
| 21. Bearings |
| 22. Support surface |
| 23. Dashed box in figure 5A |
| 24. stationary annular seal element |
| 25. Rotatable annular seal element |
| 26. Sealing retainer |
| 27. Stationary plane seal surface |
| 28. Rotatable plane seal surface |
| 29. Protrusions |
| 30. Front side |
| 31. Rear side |
| 32. Forwards direction |
| 33. Rearwards direction |
| 34. Axial length of drive shaft opening |
| 35. Maximal diameter of drive shaft opening |
| 36. Mechanical spring |
| 37. Stationary annular elastic sealing ring |
| 38. Rotatable annular elastic sealing ring |
| 39. Annular recess |
| 40. Cylindrical portion |
| 41. Recess portion |
| 42. Threaded portion of retainer |
| 43. Rear side of impeller |
| 44. Outer circumference of impeller |
| 45. Flow path |
| 46. Stationary pin |
| 47. Impeller pin |
| 48. Threaded member |
| 49. Sleeve portion of impeller |
| 50. Blades of impeller |
| 51. Through hole |
| 52. Threaded fastener |
| 53. Radially exterior side of seal elements |
| 54. Rear side of rear housing part |
| 55. Front side of rear housing part |
| 56. Width of protrusion |
| 57. Length of protrusion |
| 58. Height of protrusion |
| 59. Circumferential length between protrusions |
| 60. Fluid circulation direction |
| 61. Helix angle |
| 62. Conical interior surface |
| 63. Centre axis of drive shaft |
| 64. Circumferential direction of housing |
| 65. Intended direction of rotation of impeller |
| 66. Direction opposite to intended direction of rotation of impeller |
| 67. Radially inwards facing surface |
| 68. Forwards directed surface |
| 69. Threaded portion of housing |
| 70. Wall thickness |

The invention claimed is:

1. A centrifugal pump housing configured to accommodate an impeller mounted on an axially extending drive shaft operably connected to a motor for rotation of the impeller, the pump housing comprising:
 a rear housing part having a drive shaft opening,
 a front housing part attachable to the rear housing part for forming a pump chamber, and
 a sealing arrangement for sealing the drive shaft opening, wherein the sealing arrangement comprises:
  a stationary annular seal element rotationally locked to the rear housing part or to a sealing retainer mounted in the rear housing part, wherein the stationary annular seal element has a stationary plane seal surface facing forwards in the axial direction, and
  a rotatable annular seal element configured to be rotationally locked to the impeller or to the drive shaft, wherein the rotatable annular seal element has a rotatable plane seal surface facing rearwards in the axial direction and configured to sealingly abut against the stationary plane seal surface,
 wherein the pump housing further comprises a plurality of stationary protrusions integrally formed in the rear housing part or in the sealing retainer, wherein the plurality of stationary protrusions are located in or adjacent the drive shaft opening of the rear housing part for increasing the turbulence of a flow of product fluid in the pump housing adjacent to the sealing arrangement; and
 wherein the plurality of stationary protrusions include a plurality of steps distributed around the rear housing part or the sealing retainer.

2. The centrifugal pump housing according to claim 1, wherein the rear housing part and/or the sealing retainer has an annular recess located at or adjacent to the drive shaft opening of the rear housing part, and wherein the plurality of stationary protrusions are located in said annular recess.

3. The centrifugal pump housing according to claim 1, wherein the drive shaft opening of the rear housing part includes a cylindrical portion and an annular recess portion facing forwards towards the impeller, wherein the stationary annular seal element is directly or indirectly attached to the cylindrical portion, and wherein the plurality of stationary protrusions are located in said annular recess portion.

4. The centrifugal pump housing according to claim 1, wherein the annular sealing retainer is mounted in the rear housing part, wherein the stationary annular seal element is rotationally locked to the sealing retainer, and wherein the sealing retainer includes an annular conical recess portion facing forwards towards the impeller, and wherein the plurality of stationary protrusions are located on an interior surface of said annular conical recess portion.

5. The centrifugal pump housing according to claim 1, wherein at least some of the plurality of stationary protrusions have an elongated form for guiding a circulating working fluid towards the sealing arrangement.

6. The centrifugal pump housing according to claim 1, wherein the plurality of steps are elongated steps distributed around a circumference of an interior surface of the rear housing part or the sealing retainer, at least one of the steps facing away from an intended direction of rotation of the impeller for guiding a circulating working fluid towards the sealing arrangement.

7. The centrifugal pump housing according to claim 1, wherein the steps are formed by a stepwise increase in height followed by a decrease in height between two consecutive steps.

8. The centrifugal pump housing according to claim 7, wherein each of at least some of the steps has a width with a major component in a circumferential direction of the housing, and a length with a major component in a direction perpendicular to said circumferential direction, a maximal length of said steps is at least two times larger than a maximal width of said steps.

9. The centrifugal pump housing according to claim 7, wherein each of at least some of the steps has a width with a major component in a circumferential direction of the housing, and the width of the step is less than a maximal circumferential length between two consecutive steps.

10. The centrifugal pump housing according to claim 1, wherein the plurality of steps are distributed around a circumference of an interior surface of the rear housing part or the sealing retainer.

11. The centrifugal pump housing according to claim 6, wherein there are 2-20 steps.

12. The centrifugal pump housing according to claim 1, wherein the sealing arrangement is arranged such that product fluid comes in contact with primarily a radially exterior side of the stationary and rotatable seal elements.

13. The centrifugal pump housing according to claim 1, wherein the sealing arrangement comprises at least one mechanical spring arranged to urge the stationary annular seal element in the axial direction towards the rotatable annular seal element, or arranged to urge the rotatable annular seal element in the axial direction towards the stationary annular seal element,
and wherein the sealing arrangement further comprises:
a stationary annular elastic sealing ring located in a gap between a radially exterior surface of the stationary annular sealing element and a radially interior surface of the rear housing part or sealing retainer mounted in the rear housing part, and
a rotatable annular elastic sealing ring configured to be located in a gap between a radially exterior surface of the rotatable annular sealing element and a radially interior surface of the impeller or drive shaft.

14. A centrifugal pump assembly comprising a centrifugal pump housing as defined in claim 1, a drive shaft extending axially through the drive shaft opening of the rear housing part and an impeller accommodated in the pump housing and rotationally secured to the axially extending drive shaft.

15. The centrifugal pump assembly according to claim 14, wherein the plurality of stationary protrusions are located in a space between a rear side of the impeller and at least one of the stationary and/or rotatable annular seal elements.

16. The centrifugal pump assembly according to claim 14, wherein the plurality of stationary protrusions are located in a flow path extending in a radial direction from an outer circumference of the impeller to at least one of the stationary and/or rotatable annular seal elements via the rear side of the impeller.

17. Method for cleaning a sealing arrangement of a centrifugal pump in place, the method comprising:
supplying a cleaning fluid to a fluid inlet opening of a pump housing of the centrifugal pump, wherein the centrifugal pump comprises an axially extending drive shaft operably connected to a motor and an impeller accommodated in the pump housing and rotationally secured to the axially extending drive shaft, and wherein the pump housing comprises a rear housing part, a front housing part, and a sealing arrangement for sealing a drive shaft opening in the rear housing part,
operating the motor for driving the impeller of the centrifugal pump, wherein cleaning fluid located between the rear housing part and the impeller is configured to interact with a plurality of stationary protrusions integrally formed in the rear housing part or in a sealing retainer mounted in the rear housing part, wherein the plurality of stationary protrusions are steps that are distributed around the rear housing part or the sealing retainer and that are located in or adjacent the drive shaft opening of the rear housing part for increasing the turbulence of a flow of the cleaning fluid in the pump housing adjacent to the sealing arrangement.

18. The centrifugal pump housing according to claim 1, wherein at least some of the plurality of stationary protrusions extend in a radial and/or axial direction of the housing or inclined with respect to the radial and/or axial direction for guiding a circulating working fluid towards the sealing arrangement.

19. The centrifugal pump housing according to claim 1, wherein the plurality of steps include a plurality of elongated steps distributed around a circumference of an interior surface of the rear housing part or the sealing retainer, the plurality of elongated steps extending perpendicular to an intended direction of rotation of the impeller or inclined with respect to an intended direction of rotation of the impeller for guiding a circulating working fluid towards the sealing arrangement.

* * * * *